United States Patent [19]

Sarkisian et al.

[11] 4,188,406
[45] Feb. 12, 1980

[54] POLYMERIC BINDER FOR CHEWING GUM, METHOD FOR PREPARING SAME AND CHEWING GUM BASED ON SAID POLYMERIC BINDER

[75] Inventors: Levon A. Sarkisian; Stepan G. Matsoian; Vagram G. Gabzimalian; Shaen M. Mailian; Albert P. Galstian; Vazgen K. Azarian; Zorik S. Ter-Davtian; Raya G. Gevorkian; Ogden A. Gevorkian; Korjun L. Khudoian; Lavrenty A. Ovsepian; Amalia A. Arutjunova; Foerbakh V. Mkrtchian, all of Erevan, U.S.S.R.

[73] Assignee: Institut Organicheskoi Khimii Akademii Nauk Armyanskoi, Erevan, U.S.S.R.

[21] Appl. No.: 923,637

[22] Filed: Jul. 10, 1978

[51] Int. Cl.$^2$ .............................................. A23G 3/30
[52] U.S. Cl. ......................................... 426/3; 426/4; 424/6
[58] Field of Search ....................... 426/3-6, 426/322; 526/29.6 R, 47

[56] References Cited

U.S. PATENT DOCUMENTS

| | | | |
|---|---|---|---|
| 2,504,436 | 4/1950 | McCoubrey et al. | 426/6 |
| 2,704,753 | 3/1955 | Monaghan | 426/6 |
| 3,311,595 | 3/1967 | Kahrs et al. | 426/6 |
| 3,473,932 | 10/1969 | Sirota et al. | 426/6 |

OTHER PUBLICATIONS

Nakajima, N. "Fractionation of Linear Polyethylene with Gel Permeation Chromatography", Polymer Molecular Weight Methods pp. 99–107, 1972.

Primary Examiner—Jeanette M. Hunter
Attorney, Agent, or Firm—Haseltine, Lake & Waters

[57] ABSTRACT

A polymeric binder for use in a chewing gum of an oligomer of vinylacetate with a molecular weight of 2,500 to 6,000 and a plastifying agent, viz. water, at the following proportions of the components, percent by weight:

| | |
|---|---|
| vinylacetate oligomer | 70 to 80 |
| water | 30 to 20. |

3 Claims, No Drawings

POLYMERIC BINDER FOR CHEWING GUM, METHOD FOR PREPARING SAME AND CHEWING GUM BASED ON SAID POLYMERIC BINDER

FIELD OF THE INVENTION

The present invention relates to a polymeric binder (polymeric base) for chewing gum, to methods for preparing same and chewing gum based on said polymeric binder. The present invention is useful in the food industry.

BACKGROUND OF THE INVENTION

Known in the art is a polymeric binder for chewing gum consisting of polymers or copolymers of vinyl acetate and a plastifier.

Thus, a prior art polymeric binder for chewing gum consists of a high-molecular polymer of vinylacetate (molecular weight of from 50,000 to 80,000) and a plastifier. As the plastifier use is made of glycerol, starch molasses, dibutylphthalate.

These prior art polymeric binders, however, have some disadvantages residing in low plastic-elastic properties thereof, a high softening point and high tackiness (adherence to teeth).

Known in the art is also a method for preparing a polymeric binder (polymeric base) for chewing gum by way of radical-type bulk-polymerization of vinylacetate or polymerization thereof in a medium of an organic solvent such as ethanol, acetic acid at a temperature within the range of from 60° to 100° C. in the presence of a radical-polymerization initiator such as benzoyl peroxide. The polymerization may be performed both in the presence of molecular-weight regulators (such as acetaldehyde) and in the absence thereof. The resulting polymer is isolated from the polymerizate by conventional techniques such as distilling-off the solvent or precipitation, and a plasticizer (glycerol, starch molasses or dibutylphthalate) is added to the polymer.

This prior art method has a disadvantage residing in the necessity of using complicated process equipment.

Known in the art is a chewing gum consisting of the following components:

(1) a polymeric binder comprising a polymer of vinylacetate with a molecular weight of from 50,000 to 80,000 with a plastifying agent (glycerol, starch molasses, triacetin, 1,2-propanediol, food emulsifiers),
(2) sugar-molasses syrup,
(3) calcium carbonate,
(4) citric acid,
(5) flavouring agent such as menthol or peppermint essence.

A disadvantage of this prior art chewing gum resides in its low plasto-elastic properties, a high softening point and tackiness (adherence to teeth) as well as complexity of formulation (multi-component composition).

SUMMARY OF THE INVENTION

It is an object of the present invention to provide a polymeric binder for chewing gum which would have high plasto-elastic properties.

It is another object of the present invention to provide a polymeric binder for chewing gum having a low softening point.

It is still another object of the present invention to provide a polymeric binder for chewing gum which would have low adhesion properties.

It is also an object of the present invention to provide a method for preparing a polymeric binder for chewing gum which would make use of a simple process equipment.

It is a further object of the present invention to provide a simple-composition chewing gum on the basis of said polymeric binder which would have high plasto-elastic properties, a low softening point and low adhesion properties.

These and other objects are accomplished by the provision of a polymeric binder for chewing gum consisting of a polymer of vinylacetate and a plastifying agent; in accordance with the present invention as a polymer of vinylacetate the polymeric binder contains an oligomer of vinylacetate with a molecular weight of 2,500 to 6,000 and as a plastifying agent it contains water, the components being present in the following proportions, percent by weight:

| vinylacetate oligomer | 70 to 80 |
|---|---|
| water | 30 to 20. |

The polymeric binder (polymeric base) according to the present invention for chewing gum comprises a uniform mass of white to light-yellow colour with a softening temperature of from 30° to 40° C. having low adhesion properties (does not adhere to teeth).

To determine other properties of the polymeric binder, the latter is dehydrated in vacuum to a constant weight to give, as a result, an oligomer of vinylacetate with the following characteristics:

| intrinsic viscosity in benzene at 30° C. dl/g | 0.07–0.12 |
|---|---|
| molecular weight | 2,500–6,000 |
| Karrer plasticity at 70° C. | 0.7–0.9 |

It follows from the above data that the polymeric binder according to the present invention features high plasto-elastic properties.

Besides, the polymeric binder of the present invention has improved organoleptic properties and is well-compatible with other ingredients of chewing gum.

The method for preparing a polymeric binder for chewing gum according to the present invention comprises oligomerization of vinylacetate in an aqueous medium at a weight ratio of vinylacetate to water equal to 70–80:30–20 respectively, in the presence of a molecular-weight regulator, viz. acetaldehyde in an amount of from 10 to 16% by weight of vinylacetate and an oil-water soluble initiating system consisting of benzoyl peroxide in an amount of from 0.3 to 0.4% by weight of vinylacetate and ammonium persulphate or potassium persulphate in an amount of from 0.02 to 0.03% by weight of vinylacetate at a temperature within the range of from 50° to 55° C., followed by distilling-off the unreacted vinylacetate and acetaldehyde from the resulting desired product and washing the latter with water at a temperature of from 80° to 90° C. or treating with live steam.

The method according to the present invention is simple as to the employed process equipment.

The chewing gum according to the present invention contains a polymeric binder comprising a polymer of vinylacetate with a plastifying agent, sugar and a flavouring agent; in accordance with the present invention as the polymeric binder the chewing gum contains the polymeric binder of the above-described composition; as the flavouring agent use is made of essential oil; in addition to said components the chewing gum according to the present invention contains a plastifying agent, i.e. an ester of glycerol monostearate and diacetyltartaric acid, an ester of glycerol monostearate and acetyllactic acid or a food alloy consisting of 25% by weight of beeswax, 25% by weight of food paraffin and 50% of a vegetable oil or margarine; it also contains ethanol and cacao oil; said components being present in the following proportions, percent by weight:

| | |
|---|---|
| polymeric binder | 35 to 42 |
| essential oil | 0.1 to 0.5 |
| ester of glycerol monostearate and diacetyltartaric acid, ester of glycerol monostearate and acetyllactic acid or a food alloy consisting of 25% by weight of beeswax, 25% by weight of food paraffin and 50% by weight of vegetable oil or margarine | 0.5 to 2.0 |
| ethanol | 0.1 to 1.5 |
| cacao oil | 0.5 to 2.7 |
| sugar | the balance. |

The chewing gum according to the present invention has the following properties:

| | |
|---|---|
| softening point, °C. | 20 to 30 |
| Mooney viscosity, at 37° C. | 3 to 5 |
| Karrer viscosity at 37° C. | 0.9 to 0.8 |
| relative elongation, % | 300–500 |

It is seen from the hereinabove-given data that the chewing gum according to the present invention has a low softening point and high plasto-elastic and organoleptic properties. It also has low adhesion properties (does not adhere to teeth).

DETAILED DESCRIPTION OF THE INVENTION

The method for preparing a polymeric binder for chewing gum according to the present invention is performed in the following manner.

Into a reactor provided with a stirrer, a heating jacket and a reflux condenser there are charged vinylacetate and acetaldehyde in an amount of from 10 to 16% by weight of vinylacetate. Then water (preferably distilled or desalted) is added at a weight ratio to vinylacetate equal to 20–30:80–70 respectively. The stirrer is switched on and water is totally dispersed over the organic phase consisting of vinylacetate and acetaldehyde. Then, under stirring, into the reactor there is charged a low-soluble component of the initiating system, viz. benzoyl peroxide, in the form of a solution in vinylacetate, and an aqueous solution of another component of the initiating system, viz ammonium persulphate or potassium persulphate. Benzoyl peroxide is taken in an amount of from 0.3 to 0.4% by weight of the starting vinylacetate; ammonium persulphate or potassium persulphate is taken in an amount of from 0.02 to 0.03% by weight of the starting vinylacetate.

Temperature of the reaction mixture is increased to 50°–55° C. and the process of oligomerization of vinylacetate is conducted for 15 to 20 hours. The oligomerization process is considered completed if the content of the unreacted vinylacetate in the oligomerizate is 2 to 3% by weight. On completion of the process of oligomerization, the reflux condenser is switched to direct cooling and gradually elevating temperature to 76° C., the unreacted (residual) vinylacetate and acetaldehyde are distilled-off from the oligomerizate. The resulting reaction mass containing the polymeric binder for a chewing gum is maintained for 1–2 hours under vacuum (residual pressure of 0.4–0.6 atm) in order to additionally eliminate the unreacted vinylacetate and acetaldehyde. Then the polymeric binder is subjected, with the view to completely remove traces of said unreacted compounds, the initiating system and products of its decomposition, to a triple washing with hot water at a temperature of from 80° to 90° C. The aqueous layer is drained by means of a siphon and the final product in a hot state (at a temperature of from 70° to 90° C.) is discharged from the lower part of the reactor and cooled.

Instead of washing with hot water, the polymeric binder can be treated with live steam.

All the above-described operations are carried out in a single reactor which substantially simplifies technological scheme of the process.

The chewing gum according to the present invention is prepared in the following manner.

A polymeric binder comprising an oligomer of vinylacetate with a molecular weight of from 2,500 to 6,000 with a plastifying agent, i.e. water, at a ratio therebetween (expressed in percent by weight) equal to 70–80:30–20 respectively is charged in an amount of from 35 to 42% (by the total weight of the chewing gum) into a mixer and mixed for 10–15 minutes at a temperature of from 80° to 90° C. Thereafter, in a separate vessel a plastifying agent (in an amount of from 0.5 to 2.0% by weight), i.e. ester of glycerol monostearate and diacetyltartaric acid, an ester of glycerol monostearate and acetyllactic acid, or a food alloy consisting of 25% by weight of beeswax, 25% by weight of food paraffin and 50% by weight of a vegetable oil (such as refined cotton-seed oil, refined sun-flower oil) or margarine, along with cacao oil (in the amount of 0.5–2.7% by weight) are melted at a temperature within the range of from 40° to 50° C. The resulting melt in a liquid state is charged into said mixer and agitated for 5–7 minutes at a temperature of from 80° to 90° C. with the polymeric binder to a homogeneous condition. Afterwards, added into the mixer is ⅓ of the total amount of sugar required and the mixer contents is mixed for additional 5–7 minutes at a temperature of 70°–80° C. Then another ⅓ of sugar is added into the mixer along with ethanol in an amount of from 0.05 to 0.75% by weight and mixed at a temperature of from 60° to 70° C. for 5–7 minutes. At last, the remaining ⅓ of the total sugar amount is added into the mixer along with ethanol in an amount of from 0.05 to 0.75% by weight, an essential oil (such as peppermint oil, citrus oil, rose oil) in an amount of from 0.1 to 0.5% by weight and mixed with the switched-off heating for 5–7 minutes. The final mass of the chewing gum is discharged from the reactor and cooled to a temperature of from 30° to 35° C., whereafter it is delivered to moulding and packaging.

For a better understanding of the present invention, the following Examples illustrating its specific embodiments are given hereinbelow. Examples 1 to 3 illustrate the polymeric binder for chewing gum and the method for preparing same, while Examples 4 to 7 illustrate preparation of various compositions of the chewing gum on the basis of the polymeric binder according to the present invention.

EXAMPLE 1

Into a reactor provided with a stirrer, a reflux condenser switched to direct cooling, a jacket for heating and cooling, there are charged 215 kg of vinylacetate, 28 kg of acetaledehyde and 54 l of distilled water. Under stirring for 18 minutes at room temperature (20° C.) water is totally dispersed in the organization phase consisting of vinylacetate and acetaldehyde. Then, charged into the reactor is a solution of 0.77 kg of benzoyl peroxide in 5 kg of vinylacetate and a solution of 0.055 kg of ammonium persulphate in 1 liter of water. Temperature of the reaction mixture is increased to 52° C. and the oligomerization process is carried out at this temperature for 15 hours. The process is completed when the content of the unreacted vinylacetate in the oligomerizate constitutes 2.5% by weight. On completion of the oligomerization process, the reflux condenser is switched to direct cooling and the unreacted (residual) vinlyacetate and acetaldehyde are distilled from the oligomerizate, while gradually elevating temperature to 76° C. The resulting reaction mass containing the polymeric binder for a chewing gum is maintained under vacuum (residual pressure of 0.5 atm) for 1.5 hour to more completely remove the unreacted vinylacetate and acetaldehyde. Then the polymeric binder, for a more complete removal of traces of said unreacted compounds, the initiating system and its decomposition products, are subjected to a triple washing with hot water at the temperature of 80° C. The aqueous layer is drained by means of a siphon and the final product consisting of 80% by weight of oligomer of vinylacetate and 20% by weight of water and having a softening point of 32°-37° C. is discharged from the lower part of the reactor into containers.

To determine other properties of the polymeric binder, the latter is dehydrated in vacuum to a constant weight to give, as a result, an oligomer of vinylacetate with the following characteristics:

| intrinsic viscosity in benzene at 30° C., dl/g | 0.095 |
| molecular weight | 4,200 |
| Karrer plasticity at 70° C. | 0.8 |

The polymeric binder has low adhesion properties (does not adhere to teeth).

EXAMPLE 2

The process of oligomerization is conducted in a manner similar to that described in the foregoing Example 1, with the only exception that use is made of desalted water taken in the amount of 94.3 l, benzoyl peroxide in the amount of 0.88 kg, potassium persulphate in the amount of 0.066 kg and acetaldehyde in the amount of 35.2 kg. Temperature of the oligomerization process is maintained equal to 55° C., the process duration is 17 hours. The resulting polymeric binder, instead of washing with hot water, is treated with live steam for 15 minutes. There is obtained the desired product consisting of 70% by weight of vinylacetate oligomer and 30% by weight of water and having a softening point of 30°-35° C.

The oligomer of vinylacetate prepared after drying of the polymeric binder in vacuum to a constant weight has the following characteristics:

| intrinsic viscosity in benzene at 30° C., dl/g | 0.07 |
| molecular weight | 2,500 |
| Karrer plasticity at 70° C. | 0.9 |

The polymeric binder has low adhesion properties (does not adhere to teeth).

EXAMPLE 3

The oligomerization process is conducted as described in Example 1 hereinbefore, with the only exception that distilled water is used in the amount of 73.3 l, benzoyl peroxide in the amount of 0.66 kg, ammonium persulphate in the amount of 0.044 kg and acetaldehyde in the amount of 22 kg. The oligomerization process temperature is maintained equal to 50° C.; the process duration is 20 hours. The resulting polymeric binder is subjected to a triple washing with hot water at the temperature of 90° C. to give the desired product consisting of 75% by weight of vinylacetate oligomer and 25% by weight of water and having its softening point of 35°-40° C.

The oligomer of vinylacetate obtained after drying of the polymeric binder in vacuum to a constant weight has the following characteristics:

| intrinsic viscosity in benzene at 30° C., dl/g | 0.12 |
| molecular weight | 6,000 |
| Karrer plasticity at 70° C. | 0.7 |

The polymeric binder has low adhesion properties (does not adhere to teeth).

EXAMPLE 4

A polymeric binder comprising an oligomer of vinylacetate with the molecular weight of 4,200 with a plastifier, i.e. water, at the weight ratio thereof (percent by weight) equal to 80:20 respectively is charged into a mixer in the amount of 35.2% (by the total weight of the chewing gum) and mixed for 10-15 minutes at a temperature of from 80° to 90° C. Then, in a separate vessel, a plastifying agent, i.e. an ester of glycerol monostearate and diacetyltartaric acid in the amount of 2% by weight along with cacao oil in the amount of 2.7% by weight is melted at a temperature within the range of from 40° to 50° C. The resulting melt in a liquid condition is added into said mixer and intermixed with the polymeric binder at a temperature of from 80° to 90° C. for 5-7 minutes to a homogeneous state. Thereafter, into the mixer is added ⅓ of the total amount of sugar (19.5% by weight) and intermixed with the mixer contents at a temperature of from 70° to 80° C. for 5-7 minutes. Then, into the mixer another ⅓ (19.5% by weight) of the total amount of sugar is added along with ethanol in the amount of 0.75% by weight and intermixed for 5-7 minutes at a temperature of from 60° to 70° C. Thereafter, the remaining portion (⅓ or 19.5% by weight) of sugar is added along with 0.75% by weight of ethanol, 0.1% by weight of peppermint oil and intermixed in the mixer with switched-off heating thereof for 5-7 minutes. The final mass of the chewing gum is discharged from the mixer and cooled to a temperature of from 30°-35° C., whereafter it is fed to moulding and packaging.

The thus-prepared chewing gum has the following characteristics:

| softening point, °C. | 25 |
| Mooney viscosity at 37° C. | 4 |
| Karrer plasticity at 37° C. | 0.7 |
| relative elongation, % | 400 |

The chewing gum has low adhesion properties (does not adhere to teeth).

EXAMPLE 5

The chewing gum is prepared following the procedure described in the foregoing Example 4, with the only exception that use is made of a polymeric binder comprising an oligomer of vinylacetate with the molecular weight of 2,500 and a plastifying agent, viz. water, at a ratio therebetween (expressed in percent by weight) equal to 70:30 respectively, in the amount of 37.5% by weight. As the essential oil use is made of a citrus (orange) oil in the amount of 0.3% by weight. As the second plastifying agent use is made of an ester of glycerol monostearate and acetyllactic acid in the amount of 0.7%. Ethanol is added in the amount of 0.8% by weight, cacao oil in the amount of 1.6% by weight and sugar in the amount of 59.1% by weight.

The thus-prepared chewing gum has the following properties:

| softening point, °C. | 20 |
| Mooney viscosity at 37° C. | 3 |
| Karrer plasticity at 37° C. | 0.9 |
| relative elongation, % | 500 |

The chewing gum has low adhesion properties (does not adhere to teeth).

EXAMPLE 6

The chewing gum is prepared following the procedure described in the foregoing Example 4, except that the use is made of a polymeric binder comprising an oligomer of vinylacetate with the molecular weight of 6,000 and a plastifying agent, viz. water, at the ratio therebetween (expressed in percent by weight) equal to 75:25 respectively, in the amount of 42% by weight.

As the essential oil use is made of rose oil in the amount of 0.5% by weight. As the second plastifying agent use is made of a food alloy consisting of 25% by weight of beeswax, 25% by weight of food paraffin, and 50% by weight of refined cottonseed oil, in the amount of 0.5% by weight. Ethanol is used in the amount of 0.1% by weight, cacao oil in the amount of 0.5% by weight, sugar in the amount of 56.4% by weight.

The thus-prepared chewing gum has the following properties:

| softening point, °C. | 30 |
| Mooney viscosity at 37° C. | 5 |
| Karrer plasticity at 37° C. | 0.8 |
| relative elongation, % | 300 |

The chewing gum has low adhesion properties (does not adhere to teeth).

EXAMPLE 7

The chewing gum is prepared following the procedure described in Example 4 hereinbefore, with the only exception that use is made of a polymeric binder comprising an oligomer of vinylacetate with the molecular weight of 5,000 and a plastifying agent, viz. water, at the ratio therebetween (expressed in percent by weight) equal to 72:28 respectively, in the amount of 41% by weight. As the essential oil use is made of a citrus (lemon) oil in the amount of 0.4% by weight. As the second plastifying agent use is made of a food alloy consisting of 25% by weight of beeswax, 25% by weight of food paraffin, and 50% by weight of margarine, in the amount of 1% by weight. Ethanol is added in the amount of 1% by weight, cacao oil in the amount of 2% by weight and sugar in the amount of 54.6% by weight.

The thus-prepared chewing gum has the following properties:

| softening point, °C. | 28 |
| Mooney viscosity at 37° C. | 4 |
| Karrer plasticity at 37° C. | 0.8 |
| relative elongation, % | 350. |

The chewing gum has low adhesive properties (does not adhere to teeth).

What is claimed is:

1. A polymeric binder for chewing gum consisting of an oligomer of vinylacetate with a molecular weight of from 2,500 to 6,000 and a plastifying agent, viz. water, at the following proportions between the components, percent by weight:

| vinylacetate oligomer | 70–80 |
| water | 30–20. |

2. A method for preparing a polymeric binder for chewing gum comprising oligomerization of vinylacetate in an aqueous medium at a weight ratio of vinylacetate to water equal to 70–80:30–20 respectively, in the presence of a molecular-weight regulator, viz. acetaldehyde in an amount of from 10 to 16% by weight of vinylacetate and an oil-, water-soluble initiating system selected from the group consisting of a mixture of benzoyl peroxide with ammonium persulphate and a mixture of benzoyl peroxide and potassium persulphate benzoyl peroxide is used in an amount of 0.3–0.4% by weight of vinylacetate and persulphate in an amount of 0.02–0.03% by weight of vinylacetate; said oligomerization process is carried out at a temperature of from 50° to 55° C.; from the resulting desired product the unreacted vinylacetate and acetaldehyde are distilled-off, whereafter said desired product is washed with water at a temperature of 80°–90° C. or treated with live steam.

3. A chewing gum consisting of the following components, percent by weight:
   (a) a polymeric binder comprising an ologomer of vinylacetate with a molecular weight of from 2,500 to 6,000 and a plastifying agent, viz. water, at a ratio therebetween equal to 70–80:30–20 (percent by weight) respectively; 35 to 42
   (b) an essential oil; 0.1 to 0.5
   (c) a plastifying agent selected from the group consisting of an ester of glycerol monostearate and diacetyltartaric acid, an ester of glycerol monostearate and acetyllactic acid, and a food alloy; said food alloy consisting of 25% by weight of beeswax, 25% by weight of food paraffin, and 50% by weight of a food product selected from the group consisting of a vegetable oil and margarine;
(d) ethanol; 0.5 to 0.2
(e) cacao oil; 0.5 to 2.7
(f) sugar; the balance.